United States Patent
Mizutani

(10) Patent No.: US 6,176,648 B1
(45) Date of Patent: Jan. 23, 2001

(54) FACE MILLING CUTTER AND CUTTER BODY THEREOF

(75) Inventor: Masanori Mizutani, Itami (JP)

(73) Assignee: Sumitomo Electric Industries, Ltd., Osaka (JP)

( * ) Notice: Under 35 U.S.C. 154(b), the term of this patent shall be extended for 0 days.

(21) Appl. No.: 09/337,073

(22) Filed: Jun. 21, 1999

(30) Foreign Application Priority Data

Jul. 1, 1998 (JP) .................................................. 10-185842

(51) Int. Cl.$^7$ ....................................................... B26D 1/12
(52) U.S. Cl. ................................ 407/34; 407/43; 407/46; 407/53
(58) Field of Search ........................... 407/33, 34, 35, 407/36, 37, 38, 40, 43, 46, 53

(56) References Cited

U.S. PATENT DOCUMENTS

| | | | |
|---|---|---|---|
| 1,392,361 | * 10/1921 | Sears ................................... | 407/44 X |
| 5,102,268 | * 4/1992 | Mitchell ................................ | 407/36 |
| 5,328,307 | 7/1994 | Fees et al. . | |
| 5,480,272 | * 1/1996 | Jorgensen et al. .................... | 408/222 |
| 5,716,167 | * 2/1998 | Siddle et al. ......................... | 407/53 X |
| 5,788,426 | * 8/1998 | Daniels ................................. | 407/36 |
| 5,868,529 | * 2/1999 | Rothballer et al. .................... | 407/36 |
| 5,957,628 | * 9/1999 | Bentjens et al. ...................... | 407/35 |

FOREIGN PATENT DOCUMENTS

| | | | |
|---|---|---|---|
| 0298940 | 1/1989 | (EP) . | |
| 942295 | * 11/1963 | (GB) ....................................... | 407/35 |
| 12-8672 | 6/1937 | (JP) . | |
| 5-138423 | 6/1993 | (JP) . | |
| 5-509262 | 12/1993 | (JP) . | |

* cited by examiner

Primary Examiner—Henry W. H. Tsai
(74) Attorney, Agent, or Firm—W. F. Fasse; W. G. Fasse

(57) ABSTRACT

A face milling cutter which is capable of holding an insert with high positional accuracy and which can be manufactured with low cost is provided. The face milling cutter includes: a cutter body having a rotational axis and a plurality of grooves formed in a side surface of the cutter body; and a plurality of insert holders detachably fixed in the grooves. Each groove has a first side wall extending from the side surface toward the rotational axis and a second side wall opposite to the first side wall and extending from the side surface toward the rotational axis. The first side wall has a first protrusion and a first recess formed in a region closer to the rotational axis than the first protrusion. The second side wall has the second protrusion and the second recess formed in a region closer to the rotational axis than the second protrusion. The insert holder is fixed in the groove so as to be in contact with the first and the second recesses. The protrusions overhang surfaces of the insert holder to prevent the insert holder from flying out of the cutter body during high speed rotation.

18 Claims, 6 Drawing Sheets

FACE MILLING CUTTER AND CUTTER BODY THEREOF

BACKGROUND OF THE INVENTION

1. Field of the Invention

The present invention relates to face milling cutters and cutter bodies thereof, and more specifically to a face milling cutter having a groove for a cartridge preventing the cartridge type holder for an insert from flying out under centrifugal force and a cutter body thereof.

2. Description of the Background Art

In most cases, a wedge is used for clamping an insert in a face milling cutter. In this case, the insert is inserted into a groove which is formed both in front and side surfaces of a cutter body, so that it is held in place only by friction force. In the conventional method, however, if strong centrifugal force acts on the insert due to the high speed rotation of the cutter body, the insert is often shifted during cutting operation. In an extreme case, the insert may even fly out of the groove.

FIG. 7 is a diagram shown in conjunction with a typical method of fixing the insert in the conventional face milling cutter. In the conventional face milling cutter shown in FIG. 7, a wedge is used to prevent flying out of the insert under centrifugal force.

Referring to FIG. 7, a groove 101 and a wedge groove 103 are formed in a cutter body 100. An insert 104 is arranged in edge groove 101. A wedge 102 is pressed and fitted in wedge groove 103.

It is difficult to form with accuracy an acute angle corner 700 of edge groove 101 and an acute angle corner 600 of wedge groove 103 in which wedge 102 is press fitted as vertical angles thereof are acute. Thus, insert 104 and edge groove 101 as well as wedge 102 and wedge groove 103 are not provided with sufficient accuracy in shape, whereby positional accuracy of the edge and stability of clamping are decreased. As a result, insert 104 may be slightly shifted under centrifugal force developed during high speed rotation of cutter body 100. Further, wedge 102 may become loose due to vibration during cutting, so that insert 104 is slightly shifted. Thus, the conventional face milling cutter lacks in reliability.

To solve this problem, a mechanism having a groove in a cutter body to receive an insert which is clamped by a wedge is proposed in Japanese Patent Laying-Open No. 5-138423. FIGS. 8 and 9 are diagrams shown in conjunction with a conventionally proposed method of fixing the insert in the face milling cutter. Here, the grooves are formed in cylinder and polyhedron shapes in FIGS. 8 and 9, respectively.

Referring to FIG. 8, a groove 151 is formed generally in parallel to an axial center of cutter body 100 by cutting cutter body 100. An insert body 152 has a face 153. An edge (not shown) is connected to insert body 152 with a prescribed angle to face 153. A wedge 154 is fixed to cutter body 100 by a double screw 155 while abutting against face 153 of insert body 152.

In this configuration, even if wedge 154 becomes more or less loose, insert body 152 would not fly out under centrifugal force because of an overhanging portion 100a. In addition, edge groove 151 can be easily formed simply by cutting to open a through hole in a direction of a side surface of cutter body 100.

Referring to FIG. 9, in another conventional example, a groove 161 in a rectangular shape is formed by cutting cutter body 100 generally in parallel to the axial center of cutter body 100. An insert body 162 has an inclined face 163. An edge (not shown) is connected to insert body 162 with a prescribed angle to an abutting face 164. A wedge 154 is fixed to a cutter body 100 by a double screw 155 while abutting against inclined face 163 of insert body 162.

Again, even if wedge 154 becomes loose, insert body 162 would not fly out under centrifugal force because of an overhanging portion 100a of cutter body 100.

In short, in the aforementioned laid open application, grooves 151 and 161 are respectively formed in cylinder and polyhedron shapes to receive insert bodies 152 and 162, with reference to FIGS. 8 and 9. Insert bodies 152 and 162 are clamped with wedge 154 which is movable in a direction orthogonal to edge grooves 151 and 161. Accordingly, movement of insert bodies 152 and 162 in a radial direction of cutter body 100 is restrained by overhanging portion 100a. As a result, the stability of clamping is not decreased even in the case of the high speed rotation and shifting or flying out of insert bodies 152 and 162 under centrifugal force is surely prevented, whereby stability and accuracy for cutting process is effectively increased.

Referring to FIG. 8, however, face 153 of insert body 152 and wedge face 154a of wedge 154 are fixed by friction between the inner surface of edge groove 151 and the outer surface of insert body 152. Thus, application of cutting force makes insert body 152 slightly shift in edge groove 151. Then, the cutting angle of the edge with respect to face 153 slightly differs from those of the other edges. As a result, the edge having the different cutting angle is subjected to a stress which is also different from that of the other edges in magnitude. Accordingly, the edge having the different cutting angle suffers from a problem that positional accuracy and stability thereof are disadvantageously reduced.

Further, referring to FIG. 9, formation of edge groove 161 in such a polyhedron shape in cutter body 100 requires a slotter, wire cutter or electric discharge machine. Any of these machines has a problem in that it disadvantageously increases the number of manufacturing steps and manufacturing cost, or it is not provided with sufficient machining accuracy. Especially, cutter body 100 with a diameter exceeding 300mm requires a large wire cutter machine and hence considerably increases the manufacturing cost.

SUMMARY OF THE INVENTION

One object of the present invention is to provide a face milling cutter which is capable of holding an insert with high positional accuracy and which can be manufactured with low cost.

Another object of the present invention is to provide a cutter body of the face milling cutter which is capable of holding the insert with high positional accuracy and which can be manufactured with low cost.

Still another object of the present invention is to provide a clamping mechanism having a groove which can be economically formed in a simple shape to receive a holder of the insert in the cutter body.

A face milling cutter according to a first embodiment or aspect of the present invention is provided with a cutter body and a plurality of holders. The cutter body has a rotational axis and a plurality of grooves in its side surface. The holder is detachably seated in and fixed to the groove for holding an insert. The groove has a first side wall, also referred to as the one side wall, extending from the side surface toward the rotational axis, and a second side wall, also referred to as the other side wall, opposite to the one side wall and extending from the side surface toward the rotational axis. The one side wall has a first protrusion and a first recess formed closer to the rotational axis than the first protrusion. The other side wall has a second protrusion and a second recess formed closer to the rotational axis than the second protrusion. The holder is fixed to be in contact with the first and the second recesses. The first protrusion, the first recess, the second protrusion, and the second recess are also referred to herein as the one protrusion, the one recess, the other protrusion, and the other recess, respectively.

Thus, since the one and the other protrusions are positioned on the side surface side of the cutter body with respect to the holder at the side wall of the groove, even if centrifugal force acts on the holder during high speed rotation of the face milling cutter, the one and the other protrusions serve as stops that prevent the holder from flying out. As a result, the problem that the holder shifts toward, or even flies out from the groove toward, the side surface side of the cutter body can be surely prevented. Therefore, the insert can be held with high positional accuracy.

In addition, as will later be described, the shape of the groove of the face milling cutter according to the present invention is relatively simple as compared with those of the conventional face milling cutters. Thus, electric discharge machining is not necessary. As a result, the manufacturing cost of the face milling cutter is not increased.

In the face milling cutter according to the above described first aspect, an outer shape of the holder may be a polyhedron having a face which is in contact with the one and the other recesses.

In the face milling cutter according to the above described first aspect, cross sections of the one and the other recesses may be generally in a V shape.

In the face milling cutter according to the above described first aspect, recess angles of the cross sections of the one and the other recesses may be approximately 90°.

In this case, since the conventional acute angle corner needs not be formed, a general end mill can be used to readily manufacture the face mill cutter as will later be described. Thus, the manufacturing cost of the face mill cutter is not increased.

In the face milling cutter according to the above described first embodiment or one aspect, cross sections of the one and the other protrusions may be generally in the V shape.

In the face milling cutter according to the above described one aspect, an opening for an auxiliary screw may be formed in the cutter body, and an auxiliary screw may be further provided which is inserted into the opening for the auxiliary screw and fixed to clamp the holder.

In this case, positional accuracy of the holder is further increased. As a result, positional accuracy of the insert is increased, so that stability and accuracy for cutting are further increased.

In the face milling cutter according to the above described one aspect, an opening may be formed in the holder, and a mounting screw may be provided which is inserted into the opening to fix the holder to the cutter body.

In this case, the holder is securely fixed to the cutter body.

In the face milling cutter according to the above described one aspect, the groove may have a bottom wall connecting the one side wall and the other side wall, and a bottom wall opening may be further provided to fix the mounting screw.

In the face milling cutter according to the above described one aspect, the insert held in the holder may be further provided.

The cutter body of the face milling cutter according to a second embodiment or aspect of the present invention has a rotational axis and a plurality of grooves in the side surface. The groove has one side wall extending from the side surface toward the rotational axis and the other side wall opposite to the one side wall and extending from the side surface toward the rotational axis. The one side wall has one protrusion and one recess formed closer to the rotational axis than the one protrusion. The other side wall has the other protrusion and the other recess formed closer to the rotational axis than the other protrusion.

Since the one and the other protrusions are arranged on the side surface side of the cutter body with respect to the holder, even if centrifugal force acts on the holder during high speed rotation of the face milling cutter, the one and the other protrusions serve as stops that prevent the holder from flying out. As a result, shifting or even flying out of the groove of the holder toward the side surface side of the cutter is reliably prevented. Therefore, the insert is held with high positional accuracy.

As will later be described, the groove of the face milling cutter according to the present invention is in a relatively simple shape as compared with those of the conventional face milling cutters, whereby the electric discharge machine is not necessary. Thus, the manufacturing cost of the face milling cutter is not increased.

In the cutter body of the face milling cutter according to the above described second embodiment or so-called "another aspect" of the invention cross sections of the one and the other recesses may be generally in a V shape.

In the cutter body of the face milling cutter according to the above described another aspect, recess angles of the cross sections of the one and the other recesses may be approximately 90°.

In the cutter body of the face milling cutter according to the above described another aspect, cross sections of the one and the other protrusions may be generally in the V shape.

The clamping mechanism for the face milling cutter according to another aspect of the present invention has a plurality of grooves (also referred to as edge grooves) in the side surface (also referred to as side surface portion) of the cutter body. Each groove can receive an insert holder for detachably clamping the holder to the cutter body. The outer shape of the holder is a polyhedron. In the preferred embodiments the groove is formed in a square like shape fits the shape defined by four faces of the polyhedron of the holder. Two stops faces of the groove are arranged on the side closer to the side surface of the cutter body to form a reversed V like shape or a wedge like surface, where by a portion of the material forming the V like shape is removed to form a space. Two seating faces of the groove form a normal V like shape or a wedge like surface on the side closer to the rotational axis (also referred to as an axial center) of the cutter body.

In the clamping mechanism for the face milling cutter according to the above described second embodiment or another aspect, the holder in the polyhedron shape may be provided with an elongate hole which is almost orthogonal to a center axis of the holder. The holder may be fixed to the cutter body by a mounting screw passing through the elongate hole. The holder may be closely attached to the above mentioned normal V like shape portion or wedge like surface of the groove on the side closer to the rotational axis of the cutter body by an auxiliary screw to further enhance the clamping effect.

Therefore, as the square like groove is formed in the side surface of the cutter body such that it is opened to a front end surface of the cutter body and used for holding the holder of the insert using a prescribed end mill, shifting or flying out of the holder under centrifugal force during high speed rotation is surely prevented and the clamping mechanism is provided for the face milling cutter which ensures stability and accuracy for cutting.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment of the present invention will now be described in detail with reference to the drawings. Referring to FIGS. 1A to 1D, steps of forming a groove according to the present invention by an end mill will be described.

Figure 1A:
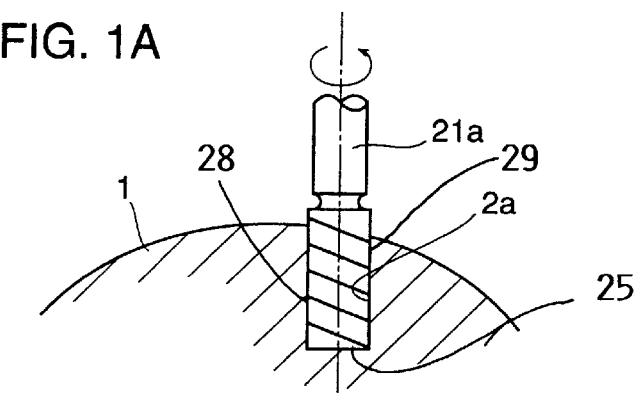
FIG. 1A is a partial cross-sectional view of a milling cutter body according to the invention, showing the first step in forming a groove to hold a cutting insert holder.

Referring to FIG. 1A, in a first step, a groove 2*a* having a first sidewall 28, a second sidewall 29, and a bottom wall 25 is formed from a front end surface of a cutter body 1 to a prescribed depth in a direction of axial center of cutter body 1 by an end mill 21*a* in a side surface of cutter body 1.

Figure 1B:
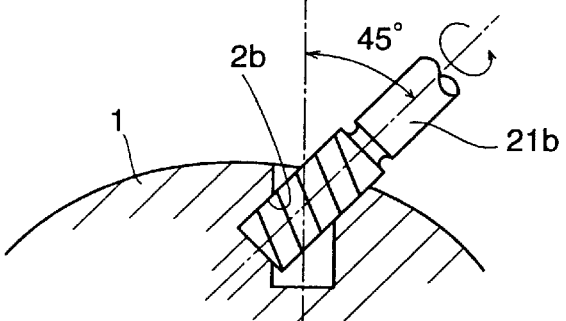
FIG. 1B is a partial cross-sectional view of the milling cutter body of FIG. 1A, showing a second step in forming the groove.

Then, as shown in FIG. 1B, in a second step, a groove 2*b* is formed in the first sidewall 28 from the front end surface of cutter body 1 to a prescribed depth which is the same as the depth of groove 2*a* in the direction of the axial center by an end mill 21*b* angled 45° with respect to end mill 21*a* (see FIG. 1A) used in the first step.

Figure 1C:
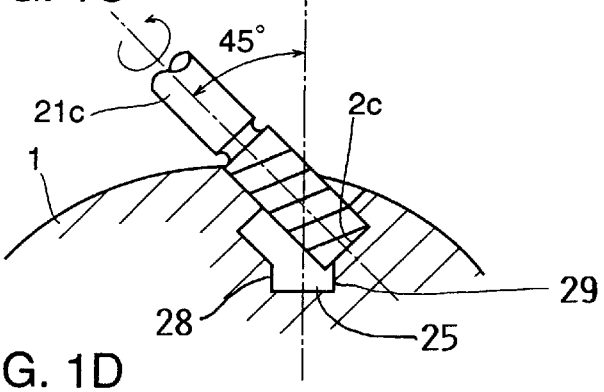
FIG. 1C is a partial cross-sectional view of the milling cutter body of FIG. 1A, showing a third step in forming the groove.

Finally, as shown in FIG. 1C, in a third step, a groove 2*c* is formed in the second sidewall 29 from the front end surface of cutter body 1 to the prescribed depth as described above in the direction of the axial center by an end mill 21*c* angled 45° with respect to end mill 21*a* in a direction opposite to that in which the end mill 21*b* is angled.

Figure 1D:
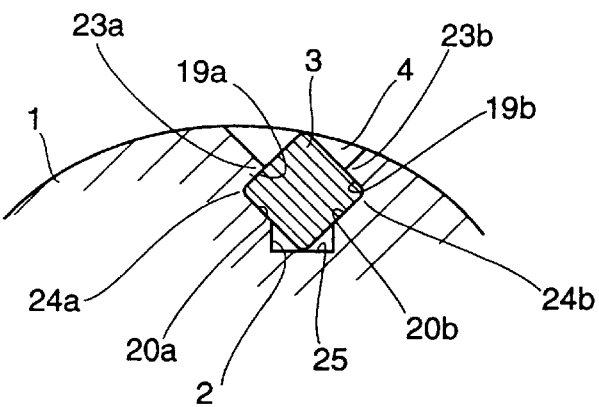
FIG. 1D is a partial cross-sectional view of the milling cutter body of FIG. 1A, showing an insert holder in the finished groove.

Thus, a square like edge groove (also referred to as a groove) 2 for receiving a holder 3 for an insert is completed as shown in FIG. 1D. It is noted that end mills 21*a*, 21*b* and 21*c* may be of the same size.

As seen in FIG. 1D, holder stop faces 19*a* and 19*b* of edge groove 2 which form a reversed V like shape correspond to a wedge like surface on the side of the side surface of cutter body 1. Holder seating faces 20*a* and 20*b* of edge groove 2 form a normal V like shape and correspond to a wedge like surface on the side toward an axial center of cutter body 1. Two faces of holder 3 seat against holder seating faces 20*a* and 20*b* in the normal V like shape. A mounting screw described in more detail below for fixing holder 3 is inserted from a space 4. In addition, an opening for insertion of the mounting screw is preferably formed in a bottom wall 25 of edge groove 2.

Still referring to FIG. 1D, it can be seen that, side wall protrusions 23*a* and 23*b* are formed as one and the other protrusions, and side wall recesses 24*a* and 24*b* are formed as one and the other recesses at the respective side surfaces of edge groove 2. Since side wall protrusions 23*a* and 23*b* are positioned on the side surface side of cutter body 1 with respect to holder 3 at the side surface of edge groove 2, even if centrifugal force acts on holder 3 during high speed rotation of the face milling cutter, side wall protrusions 23*a* and 23*b* serve as stops for preventing holder 3 from flying out. As a result, shifting or even flying out from edge groove 2 of holder 3 toward the side surface of cutter body 1 is reliably prevented. Therefore, an insert mounted on holder 3 can be held with high positional accuracy.

As shown in FIG. 1D, since the cross sectional shape of edge groove 2 is relatively simple as compared with those of the conventional face milling cutters, the edge groove can be formed with a general end mill as shown in FIGS. 1A to 1C. As a result, the manufacturing cost of the face milling cutter is not increased as compared with the conventional case.

Figure 2:
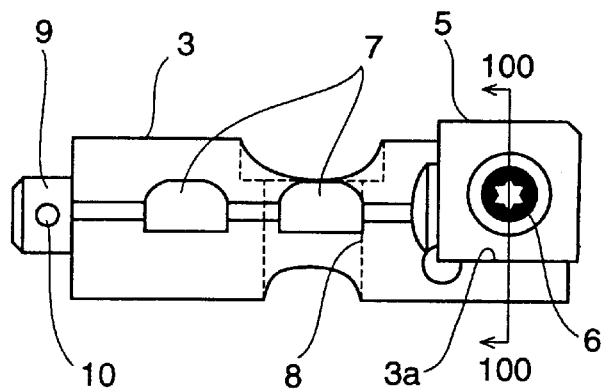
FIG. 2 is a front view showing a holder of the present invention.

FIG. 2 is a front view showing holder 3 mounted with an indexable insert. An insert 5 is fixed to an insert mounting portion 3*a* by a screw 6. Insert 5 may generally include a hard metal alloy, or only the edge portion thereof may include cBN, sintered-diamond or brazed hard ceramics. After holder 3 is fixed to cutter body 1 with a mounting screw described below, when holder 3 is forced against two faces (faces 20*a* and 20*b* forming the normal V like shape, see FIG. 1D) on the side of the axial center of edge groove 2 of cutter body 1 by an auxiliary screw described below, face 7 serves as an abutting surface with which the auxiliary screw is brought into contact.

Figure 3:
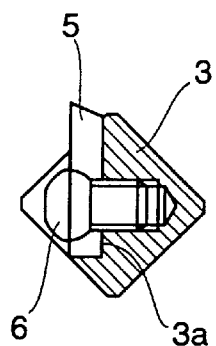
FIG. 3 is a partial cross sectional view showing the holder of the present invention.

FIG. 3 is a cross sectional view showing holder 3 mounted with insert 5 taken along the line 100—100 in FIG. 2. Mounting portion 3*a* for insert 5 is provided in one portion of holder 3 in the rectangle-cylinder shape. Insert 5 is fixed to holder 3 with machine screw 6.

Figure 4:
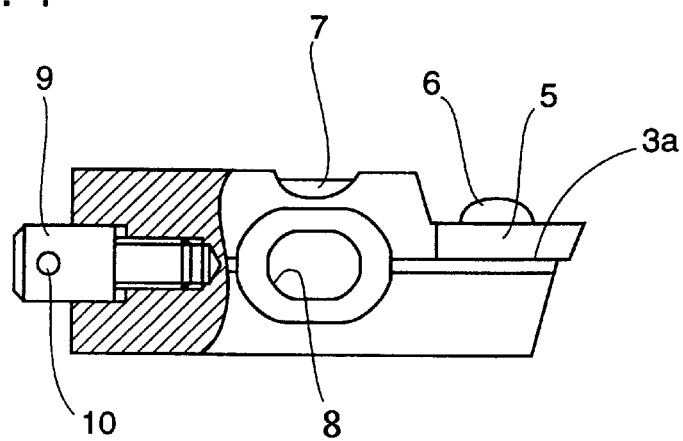
FIG. 4 is a side view showing the holder of the present invention.

FIG. 4 is a side view showing holder 3. An elongate hole 8 is arranged to be orthogonal to a center line of holder 3. An adjusting screw 9 for fine adjusting a height of each edge of insert 5 is shown where holder 3 is partially shown in a cross section from the front surface of cutter body 1. A hole 10 is formed in adjusting screw 9. Adjusting screw 9 is rotatable and, rotation thereof allows a length of holder 3 to be changed. A cartridge assembly comprising insert 5 and holder 3, as shown in FIGS. 2 to 4, is prepared for each insert holder groove on the milling cutter body 1.

Figure 5:
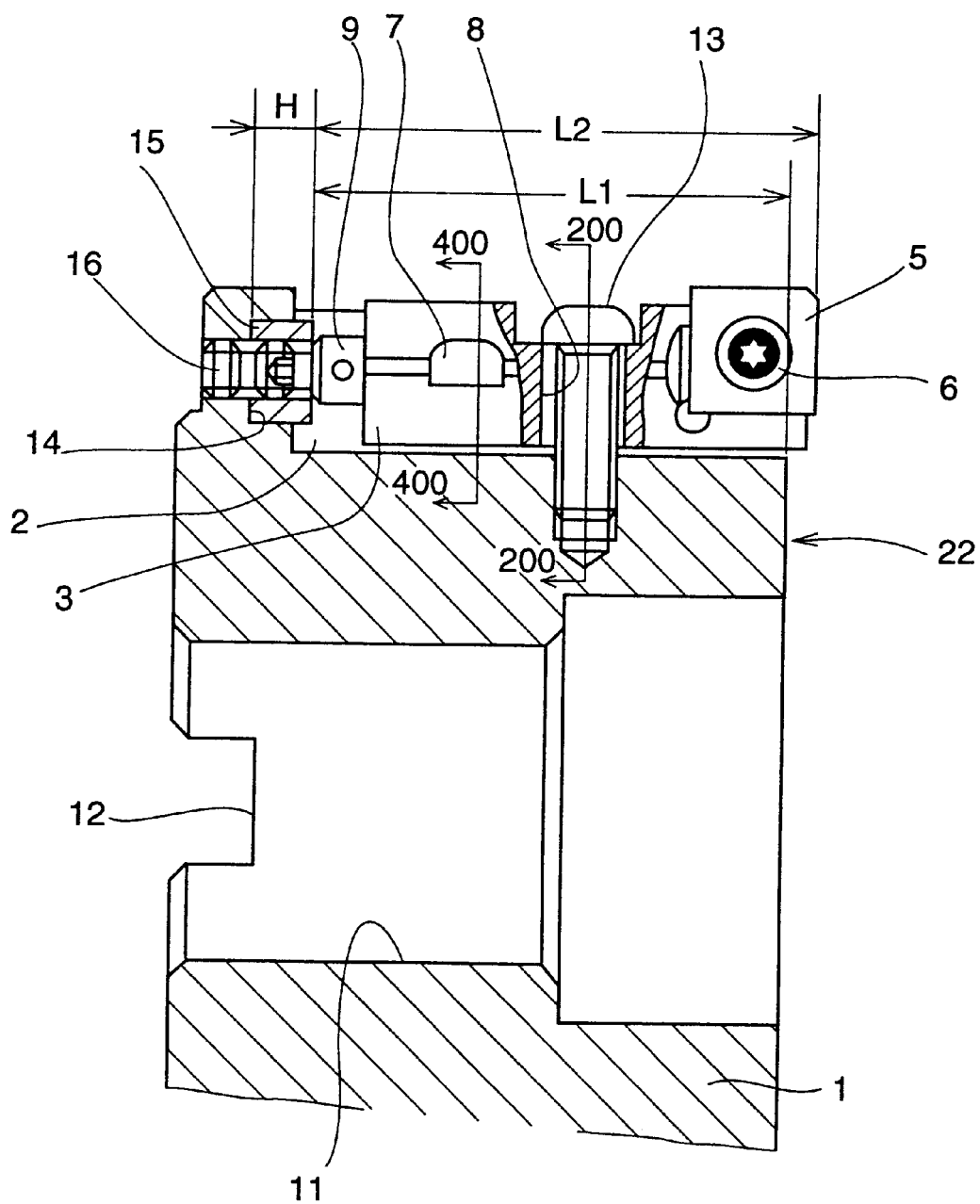
FIG. 5 is a cross sectional view showing the holder mounted to a cutter body of the present invention.

FIG. 5 is a cross sectional view showing holder mounted to cutter body 1. In an axial center of cutter body 1, a mounting hole 11 to be fitted to an arbor of a machine and a key way 12 transferring rotation torque are provided. Holder 3 is placed in edge groove 2 from the front end surface 22 of cutter body 1. Holder 3 is fixed to cutter body 1 by mounting screw 13 which is inserted into elongate hole 8 in holder 3. An abutting member 15 is fixed to cutter body 1 by double screw 16 at an end of edge groove 2 facing the milling machine. Mounting screw 13 is fixed to cutter body 1 when the end face of adjusting screw 9 for fine adjusting the height of each edge of insert 5 abuts against abutting member 15. In addition, an end of an auxiliary screw 17 (see FIG. 6) for clamping holder 3 to cutter body 1 abuts against face 7, so that holder 3 is forced against two faces (holding seating faces 20a and 20b forming the normal V like shape, see FIG. 1D) of edge groove 2 to enhance the clamping effect.

It is noted that a height H of abutting member 15 is selected such that a distance L1 of cutter body 1 for each of edge grooves 2 from front end surface 22 is uniform. A full distance L2 of the cartridge assembly of holder 3 and insert 5 is kept constant primarily by fine adjusting adjusting screw 9. Thus, combination of edge groove 2 and holder 3 does not restrain the adjustability of the height of the inserts (that is, variation in height of inserts 5 due to the combination of edge groove 2 and holder 3 can be maintained at a level which is equal to or lower than an acceptable level). As a result, insert 5 can readily be adjusted in a short period of time.

Figure 6:
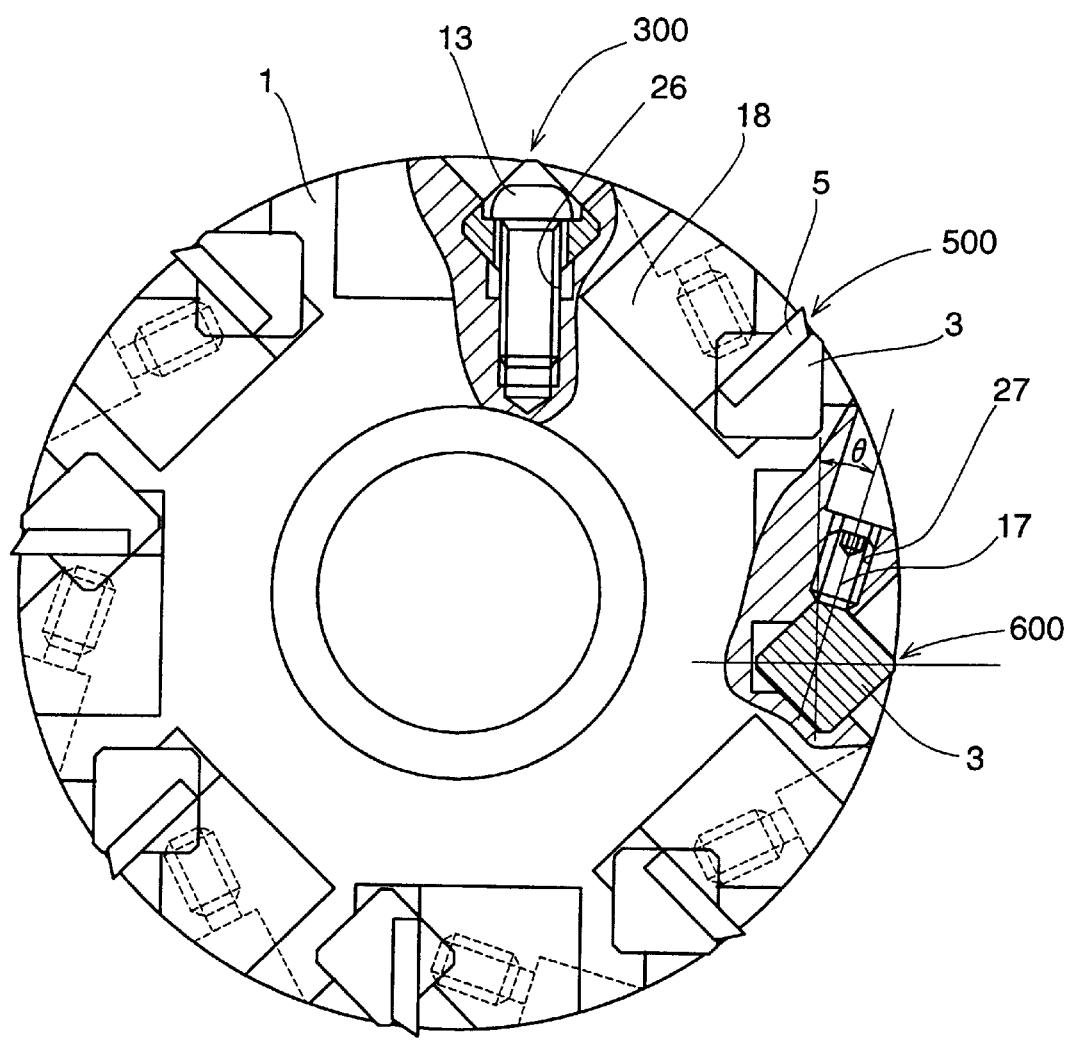
FIG. 6 is a front view showing the holder mounted to the cutter body of the present invention.
Figure 7:
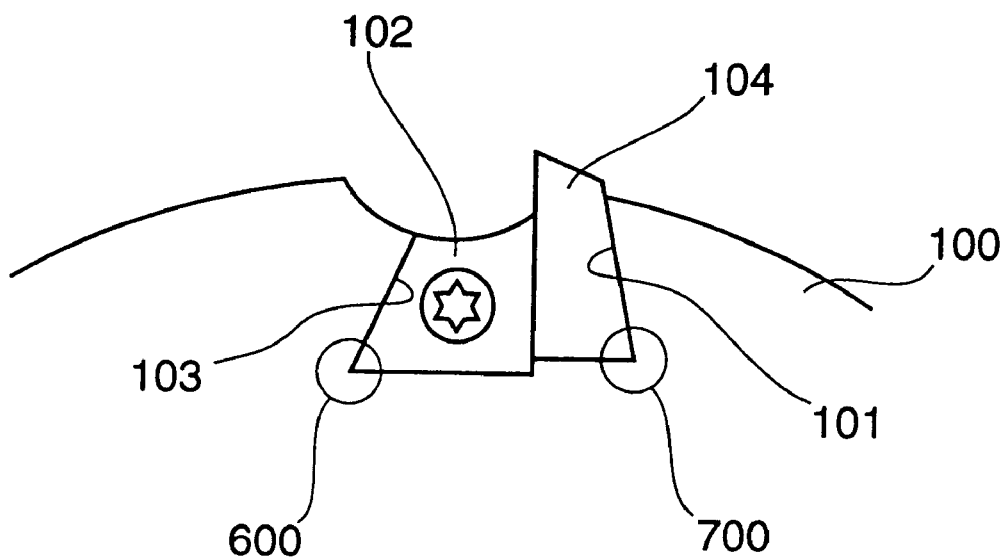
FIG. 7 is a partial diagram illustrating a conventional method of fixing the insert using a wedge.
Figure 8:
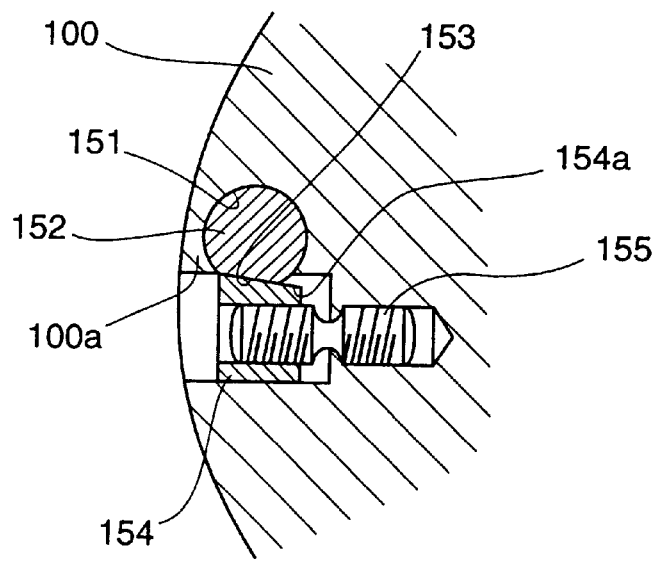
FIG. 8 is a partial cross-sectional view illustrating a conventional clamping mechanism having an edge groove in a cylindrical shape.
Figure 9:
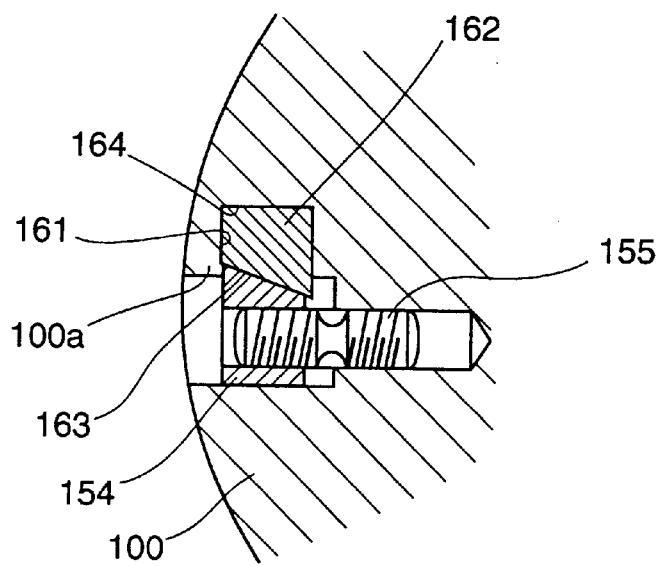
FIG. 9 is a partial cross-sectional view illustrating a conventional clamping mechanism having an edge groove in a polyhedron shape.

FIG. 6 is a front view showing a mounted holder 3 as seen from the front surface of cutter body 1. A region 300 corresponds to a cross sectional view taken along the line 200—200 in FIG. 5, which is a partial cross sectional view showing a portion near mounting screw 13. A region 500 corresponds to a schematic front view showing cutter body 1. A region 600 is a partial cross sectional view showing a portion around auxiliary screw 17 corresponding to a cross sectional view taken along the line 400—400 in FIG. 5. In region 500, a chip pocket 18 is formed to have a prescribed depth in a step separate from that of forming edge groove 2. In addition, as shown in region 600, an inserting angle θ of auxiliary screw 17 is preferably set to at least 5° in order to enhance the clamping effect of holder 3. Preferably, two, rather than one, auxiliary screws 17 are provided.

Further, in the face milling cutter used for light cutting such as finishing, only one of mounting screw 13 and auxiliary screw 17 may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A face milling cutter, comprising:

a cutter body having a rotational axis, an outer side surface and a plurality of parallel linear grooves each extending substantially parallel to said rotational axis in said outer side surface; and a plurality of insert holders;

wherein each one of said grooves respectively has a first side wall and a second side wall that face opposite each other and that extend from said outer side surface inwardly into said cutter body, said first side wall having a first stop face and a first seating face and said second side wall having a second stop face and a second seating face, said first seating face and said second seating face being closer to said rotational axis than said first stop face and said second stop face, and a bottom portion having a bottom wall and bottom side walls, said bottom portion extending between and interconnecting respective ends of said first seating face and said second seating face, wherein said first side wall includes a first recess bounded by said first stop face and said first seating face and a first protrusion, said second side wall includes a second recess bounded by said second stop face and said second seating face and a second protrusion, and said first and second recesses are respectively closer to said rotational axis than are said first and second protrusions, wherein said first stop face and said second seating face are arranged opposite and parallel to each other and said second stop face and said first seating face are arranged opposite and parallel to each other, and wherein each one of said insert holders respectively has an outer holder surface and is respectively seated in a respective one of said grooves so as to be engaged in said first recess and said second recess of said respective groove with said first protrusion and said second protrusion of said respective groove respectively extending over and contacting at least one portion of said outer holder surface facing outwardly toward said outer side surface of said cutter body.

2. The face milling cutter according to claim 1, wherein said holder has a substantially rectangular outer shape formed by said outer holder surface, which includes at least one contact face in contact with said first recess and said second recess.

3. The face milling cutter according to claim 1, wherein said first recess and said second recess each have generally a V-shaped cross-section.

4. The face milling cutter according to claim 3, wherein said first seating face and said first stop face bound said first recess and form said V-shaped cross-section of said first recess therebetween, said second seating face and said second stop face bound said second recess and form said V-shaped cross-section of said second recess therebetween, and a first recess angle of said V-shaped cross-section between said first seating face and said first stop face and a second recess angle of said V-shaped cross-section between said second seating face and said second stop face are each respectively approximately 90°.

5. The face milling cutter according to claim 4, wherein said first protrusion and said second protrusion each have a generally V-shaped cross-section.

6. The face milling cutter according to claim 1, further comprising a plurality of auxiliary screws, wherein said cutter body has a plurality of auxiliary screw openings therein, and wherein said auxiliary screws are respectively inserted into and secured in said auxiliary screw openings so as to press against and clampingly secure said insert holders to said cutter body.

7. The face milling cutter according to claim 1, further comprising a plurality of mounting screws, wherein said cutter body has a plurality of threaded holes therein and each one of said insert holders has a respective mounting screw opening, and wherein said mounting screws are respectively inserted through said mounting screw openings in said insert holders into said threaded holes so as to fix said holders to said cutter body.

8. The face milling cutter according to claim 7, wherein said bottom wall of each one of said grooves has a respective one of said threaded holes therein.

9. The face milling cutter according to claim 8, further comprising a plurality of auxiliary screws, wherein said cutter body has a plurality of auxiliary screw openings therein, and wherein said auxiliary screws are respectively inserted into and secured in said auxiliary screw openings so as to press against and clampingly secure said insert holders to said cutter body.

10. The face milling cutter according to claim 1, further comprising an insert held in said holder.

11. A cutter body of a face milling cutter, comprising a rotational axis, an outer side surface, and a plurality of parallel linear grooves each extending substantially parallel to said rotational axis in said outer side surface,
   wherein each one of said grooves respectively has a first side wall and a second side wall that face opposite each other and that extend from said outer side surface inwardly into said cutter body, said first side wall having a first stop face and a first seating face and said second side wall having a second stop face and a second seating face, said first seating face and said second seating face being closer to said rotational axis than said first stop face and said second stop face, and a bottom portion having a bottom wall and bottom side walls, said bottom portion extending between and interconnecting respective ends of said first seating face and said second seating face,
   wherein said first side wall includes a first recess bounded by said first stop face and said first seating face and a first protrusion, said second side wall includes a second recess bounded by said second stop face and said second seating face and a second protrusion, and said first and second recesses are respectively closer to said rotational axis than are said first and second protrusions,
   and wherein said first stop face and said second seating face are arranged opposite and parallel to each other and said second stop face and said first seating face are opposite and parallel to each other.

12. The cutter body of the face milling cutter according to claim 11, wherein said first recess and said second recess each have a generally V-shaped cross-section.

13. The cutter body of the face milling cutter according to claim 12, wherein
   said first seating face and said first stop face bound said first recess and form said V-shaped cross-section of said first recess therebetween,
   said second seating face and said second stop face bound said second recess and form said V-shaped cross-section of said second recess therebetween, and
   a first recess angle of said V-shaped cross-section between said first seating face and said first stop face, and a second recess angle of said V-shaped cross-section between said second seating face and said second stop face, are each respectively approximately 90°.

14. The cutter body of the face milling cutter according to claim 13, wherein said first protrusion and said second protrusion each have a generally V-shaped cross-section.

15. A milling cutter body that is rotatable about a rotation axis, is outwardly bounded by an outer perimeter surface, and has at least one groove adapted to receive a cutting insert holder in said outer perimeter surface, wherein:
   said groove extends parallel to said rotation axis in said outer perimeter surface and penetrates inwardly into said cutter body from said outer perimeter surface along a groove center plane;
   said groove is bounded by a right side wall and a left side wall respectively facing opposite each other on opposite sides of said groove center plane, and a bottom wall extending perpendicular to said groove center plane, between and interconnecting respective ends of said side walls closest to said rotation axis;
   said right side wall includes a right side first face that adjoins and extends from said outer perimeter surface and slopes toward said groove center plane, a right side second face that adjoins and extends from said right side first face and slopes away from said groove center plane, and a right side third face that adjoins and extends from said right side second face and slopes toward said groove center plane;
   said left side wall includes a left side first face that adjoins and extends from said outer perimeter surface and slopes toward said groove center plane, a left side second face that adjoins and extends from said left side first face and slopes away from said groove center plane, and a left side third face that adjoins and extends from said left side second face and slopes toward said groove center plane;
   said right side second face is perpendicular to said right side third face;
   said left side second face is perpendicular to said left side third face;
   said right side first face is parallel to said left side second face; and
   said left side first face is parallel to said right side second face.

16. The milling cutter body according to claim 15, wherein:
   said right side wall further includes a right side fourth face that extends parallel to said groove center plane from said right side third face to said bottom wall, and that includes said respective end of said right side wall closest to said rotation axis; and
   said left side wall further includes a left side fourth face that extends parallel to said groove center plane from said left side third face to said bottom wall, and that includes said respective end of said left side wall closest to said rotation axis.

17. The milling cutter body according to claim 15, wherein:
   said right side second face is parallel to said left side third face; and
   said left side second face is parallel to said right side third face.

18. A method of making the milling cutter body according to claim 15, comprising the following steps:
   a) providing a cutter body blank having said outer perimeter surface and not having said groove therein;
   b) using a cylindrical end mill, cutting into said cutter body blank by rotating said end mill about a mill rotation axis, orienting said mill rotation axis to lie in said groove center plane, and moving said end mill along said groove center plane, so as to form said bottom wall;
   c) using said cylindrical end mill, cutting into said cutter body blank by rotating said end mill about said mill rotation axis, orienting said mill rotation axis to intersect said groove center plane at a first angle, and moving said end mill along said groove center plane, so as to form said right side first face, said left side second face and said left side third face; and
   d) using said cylindrical end mill, cutting into said cutter body blank by rotating said end mill about said mill rotation axis, orienting said mill rotation axis to intersect said groove center plane at a second angle, and moving said end mill along said groove center plane, so as to form said left side first face, said right side second face and said right side third face.

* * * * *

UNITED STATES PATENT AND TRADEMARK OFFICE
CERTIFICATE OF CORRECTION

PATENT NO. : US 6,176,648 B1
DATED : Jan. 23, 2001
INVENTOR(S) : Mizutani It is certified that error appears in the above-identified patent and that said Letters Patent is hereby corrected as shown below:

Col. 4, line 44, after "shape", insert --that--.

Col. 7, line 15, after "faces", replace "(holding" by --(holder--;
line 41, after "angle", replace "0" by --θ--.

Signed and Sealed this

Twenty-ninth Day of May, 2001

Attest:

NICHOLAS P. GODICI

*Attesting Officer*   *Acting Director of the United States Patent and Trademark Office*